United States Patent
Ling et al.

(10) Patent No.: US 8,036,844 B2
(45) Date of Patent: Oct. 11, 2011

(54) TRANSIENT PERFORMANCE DATA PHASE COMPENSATION SYSTEM AND METHOD

(75) Inventors: Richard Ling, Scottsdale, AZ (US); Oswald Harris, Tempe, AZ (US); Alan Hemmingson, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 783 days.

(21) Appl. No.: 12/053,994

(22) Filed: Mar. 24, 2008

(65) Prior Publication Data

US 2009/0240470 A1    Sep. 24, 2009

(51) Int. Cl.
  *G01D 18/00*    (2006.01)
(52) U.S. Cl. ............ 702/89; 702/72; 702/79; 324/76.77
(58) Field of Classification Search ............ 702/71, 702/72, 79, 89, 178, 187; 324/76.77, 76.82, 324/76.83
  See application file for complete search history.

(56) References Cited

U.S. PATENT DOCUMENTS

| | | | |
|---|---|---|---|
| 4,423,594 A | 1/1984 | Ellis | |
| 4,928,240 A | 5/1990 | Davison et al. | |
| 5,189,620 A | 2/1993 | Parsons et al. | |
| 5,424,962 A | 6/1995 | Bouchez et al. | |
| 5,680,310 A | 10/1997 | Morgan et al. | |
| 6,059,522 A | 5/2000 | Gertz et al. | |
| 6,317,655 B1 | 11/2001 | Khots et al. | |
| 6,810,358 B1 * | 10/2004 | Lang et al. | 702/182 |
| 6,827,177 B2 | 12/2004 | Asada et al. | |
| 7,107,188 B2 | 9/2006 | Veneruso et al. | |
| 7,142,974 B2 | 11/2006 | Sugita et al. | |
| 7,236,876 B2 | 6/2007 | Sarlashkar et al. | |

* cited by examiner

*Primary Examiner* — Manuel L Barbee
(74) *Attorney, Agent, or Firm* — Ingrassia Fisher & Lorenz, P.C.

(57) ABSTRACT

A system and method of phase compensating transient performance data are provided. Transient performance data are collected for a plurality of parameters, and two of the parameters are selected. A transfer function is applied to the transient performance data for at least one of the selected parameters to thereby generate phase compensated performance data that is representative of a steady state relationship between the selected parameters.

17 Claims, 3 Drawing Sheets

TRANSIENT PERFORMANCE DATA PHASE COMPENSATION SYSTEM AND METHOD

TECHNICAL FIELD

The present invention generally relates to data collection and analysis and, more particularly, to processing and analysis of transient performance data collected from a machine such as, for example, a gas turbine engine.

BACKGROUND

Performance analysis of various machines, such as aircraft gas turbine engines, is becoming increasingly desirable. This is because a performance analysis may be used in the development of new engines, as well as the monitoring of presently operating engines. In particular, in the context of presently operating engines, a performance analysis may be used to identify one or more components in an engine that may be adversely impacting engine performance.

Typically, a performance analysis of a gas turbine engine (or other machine) is conducted using steady state performance data. A performance analysis conducted using performance data collected from a machine that is not running in a sufficiently steady state condition will likely not be sufficiently accurate. This could have various undesirable effects. For example, it could lead to less than optimal component design or an inaccurate engine power capability assessment.

In the context of a gas turbine engine, steady state performance data are performance data that are collected after the engine achieves thermal equilibrium. In many instances an aircraft gas turbine engine may experience few, if any, truly steady state conditions due, or example, to changes in flight conditions or engine power setting. Thus, the limitation on using steady state performance data for a performance analysis can be potentially troublesome, since the collected data may not be steady state performance data. In such instances, a performance analysis engineer may need to choose between discarding the collected data entirely, or using non-steady state performance data and compromising the accuracy of the performance analysis.

Hence, there is a need for a system and method of conducting performance analysis of a machine, such as an aircraft gas turbine engine, using performance data that are not steady state performance data. The present invention addresses at least this need.

BRIEF SUMMARY

In one embodiment, and by way of example only, a method of phase compensating transient performance data includes collecting transient performance data for a plurality of parameters, and selecting two of the parameters. A transfer function is applied to the transient performance data for at least one of the selected parameters to thereby generate phase compensated performance data that is representative of a steady state relationship between the selected parameters.

In another exemplary embodiment, a system for phase compensating transient performance data includes a plurality of sensors and a processor. Each sensor is operable to sense a parameter and supply transient performance data representative of the sensed parameter. The processor is coupled to receive the transient performance data from each of the plurality of sensors and is configured to select two of the parameters, and apply a transfer function to the transient performance data for at least one of the selected parameters to thereby generate phase compensated performance data that is representative of a steady state relationship between the selected parameters.

Other desirable features and characteristics of the transient performance data analysis system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although various embodiments are described herein in the context of a gas turbine engine, such as may be used as an aircraft propulsion engine, the embodiments may be used with various other machines and in various other end-use environments.

Figure 1:
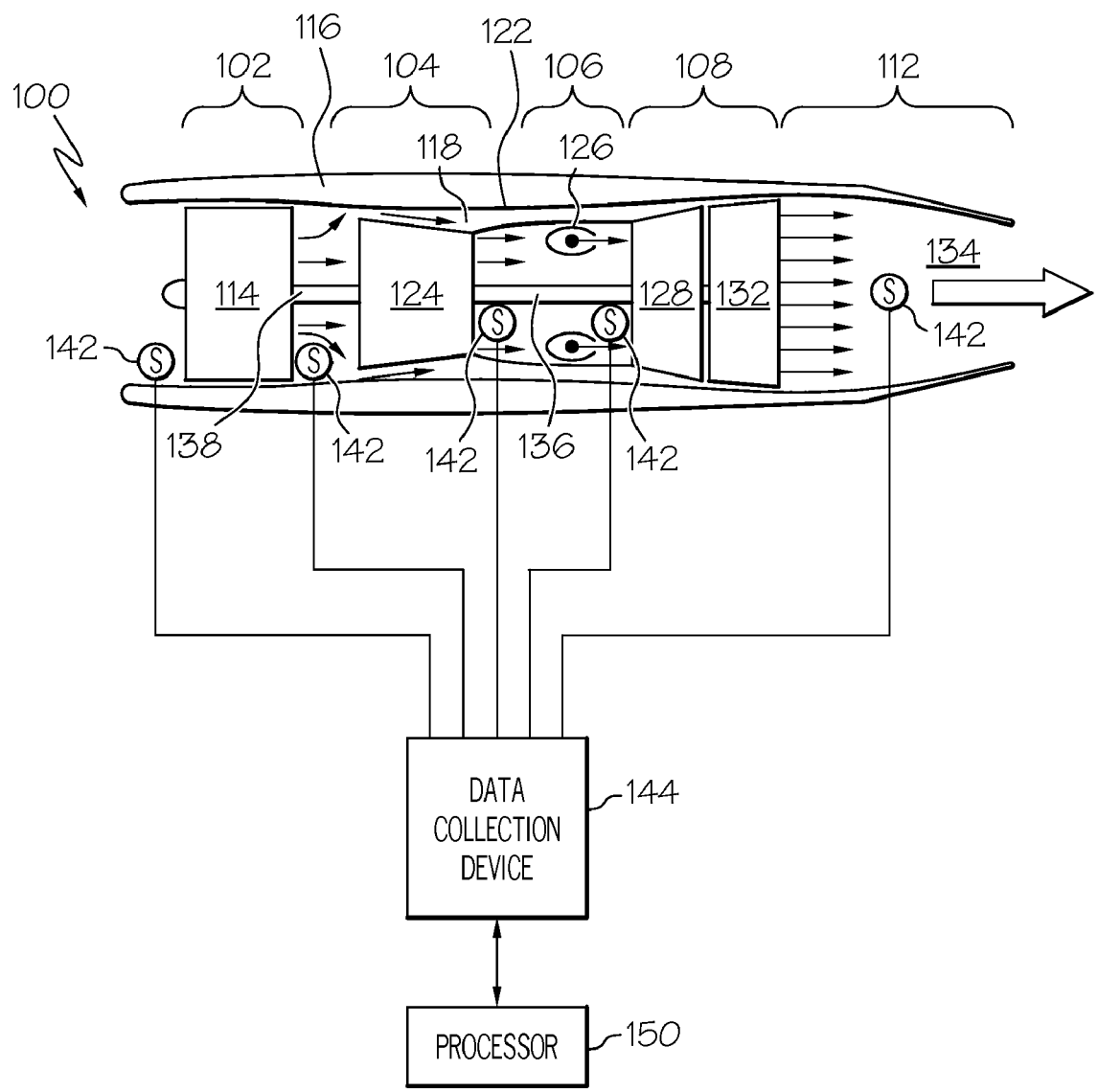
FIG. 1 is a functional block diagram of an exemplary gas turbine engine system.

Turning now to FIG. 1, a functional block diagram of an exemplary gas turbine engine is depicted. The depicted engine 100 is a multi-spool turbofan gas turbine propulsion engine, and includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through a propulsion nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

As FIG. 1 further depicts, a plurality of sensors 142 may be disposed in or near the engine 100. Each of the sensors 142 is coupled to a data collection device 144 and is operable to sense an engine parameter and supply performance data representative of the sensed parameter to the data collection device 144. It will be appreciated that the particular number, type, and location of each sensor 142 may vary. It will additionally be appreciated that the number and types of performance data supplied by the sensors 142 may vary depending, for example, on the particular engine type and/or configuration. In the depicted embodiment, however, at least a subset of the depicted sensors 142 supply performance data representative of, or that may be used to determine, engine inlet pressure, engine inlet temperature, engine speed, fuel flow, compressor discharge pressure, turbine inlet temperature, engine torque, shaft horsepower, and thrust, to name just a few.

No matter the specific number and types of performance data, these data are supplied to the data collection device 144. The data collection device 144 may also be variously configured and implemented. For example, the data collection device 144 may be the flight data recorder for an aircraft, or a portion of the flight data recorder. The data collection device 144 may alternatively be part of another system installed within an aircraft, or it may be a stand-alone device. The data collection device 144 may be implemented using various types of static RAM (random access memory) or other suitable read/write memory device. In any case, the data collection device 144 receives and stores, at least temporarily, at least a portion of the performance data supplied thereto by the sensors 142.

The performance data collected and stored within the data collection device 144 are used to conduct a performance analysis of the engine 100. It will be appreciated that the performance analysis may be conducted in real-time, while the engine 100 is operating, at some time after the collected performance data have been read by another device from the data collection device 144, whether the engine 100 is running or not, or at some time after the engine 100 has been shut-down. No matter when the performance analysis is conducted, the performance analysis is preferably conducted using a suitably programmed processor 150. The processor 150, which may be implemented using one or more suitable general purpose microprocessors, may be part of the same system as the data collection device 144 or it may be a stand-alone system that is configured to at least temporarily interface with the data collection device 144. Moreover, in some embodiments the data collection device 144 may form part of the processor 150.

Regardless of the specific implementation of the data collection device 144 and processor 150, the processor 150 is configured to conduct a performance analysis of the engine 100 using the performance data supplied from the sensors 142. The performance analysis that the processor 150 conducts is accurate regardless of whether the collected performance data are steady state data or transient data. This is because the processor 150 is further configured to generate, using transient performance data, data that are representative of steady state performance data, which may then be used in a subsequent performance analysis. The method that the processor 150 implements to generate this performance data is depicted as a process diagram in FIG. 2, and with reference thereto will now be described.

The processor 150, in implementing the depicted method, retrieves at least a portion of the performance data 202 that are collected during, for example, the flight of the aircraft in which the engine 100 is installed. In the depicted embodiment, the processor 150 then corrects the performance data for the ambient conditions 204 at the time the data were collected by applying what are generally referred to as the theta correction ($\theta$-correction) and the delta correction ($\delta$-correction). As is generally known, the $\theta$-correction is an ambient temperature correction factor, and the $\delta$-correction is an ambient pressure correction factor. It will be appreciated that application of the ambient condition corrections is merely preferred, and need not be implemented if so desired.

Once the performance data are retrieved and, at least in the preferred embodiment, corrected for ambient conditions, the processor 150 then selects two of performance parameters 206. It will be appreciated that the performance parameters that are selected may vary and may be selected based on the type of performance relationship that is desired to be analyzed. For example, if it is desired to analyze the relationship between engine torque (Q) and turbine inlet temperature (T5), then the performance data for these two parameters are selected. Of course, various other pairs of parameters may, and likely will, be selected to conduct a complete performance analysis of the engine 100.

Before proceeding further it is noted that for clarity and ease of illustration and discussion, the selected performance parameters are represented generically as $X(t)$ and $Y(t)$. It is additionally noted that the data associated with these performance parameters are transient data, as is evident by the phase shift between the performance parameter data 208 and the resultant hysteresis loop caused by this phase difference when the two parameters are plotted together 212.

Returning now to the description of the methodology, the processor 150, upon selecting the two parameters 206, generates phase compensated performance data that are representative of a steady state relationship between the selected parameters. This is evident by the in-phase relationship between the performance parameter data 214 and the relatively small or relatively non-existent hysteresis loop when the two parameters are plotted together 216. To generate the phase compensated performance data, the processor 150 applies a transfer function 218 to the performance data of either or both of the selected parameters $X(t)$ and $Y(t)$. Although the depicted process flow illustrates that transfer functions may be applied to the performance data of both of the selected parameters, it will be appreciated that a transfer function may only be applied to the performance data of one of the selected parameters. It will additionally be appreciated that the transfer function (or functions) that is (or are) applied, may be known or may be determined dynamically. A more detailed description of an exemplary method for dynamically determining the transfer function(s) is provided further below.

Figure 2:
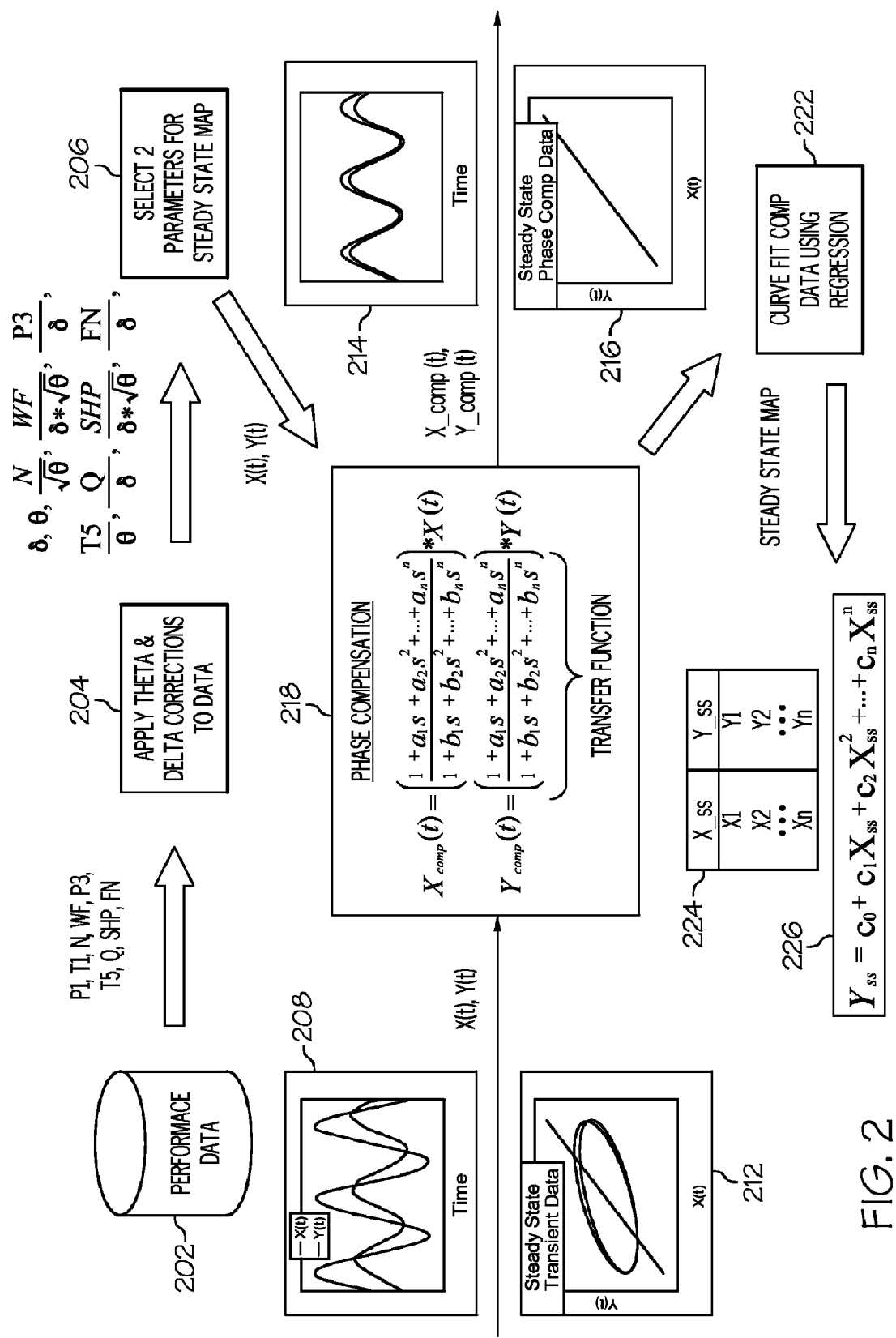
FIG. 2 depicts a process diagram of an exemplary method that may be implemented using performance data collected from the engine system of FIG. 1.

After the phase compensated performance data are generated, the processor 150 then applies a curve fit to the phase compensated performance data 222. It will be appreciated that the curve fit that is applied may vary and may be implemented using any one of numerous known techniques, such as linear regression or neural network. The processor 150, upon applying a curve fit, generates a steady state map that is representative of the steady state relationship between the selected performance parameters $X(t)$ and $Y(t)$. As FIG. 2 depicts, the steady state map may comprise a steady state table 224, a steady state equation 226, or both. In any case, the steady state map 222 may be used to conduct a relatively accurate performance analysis based on the transient performance data that were collected.

Figure 3:
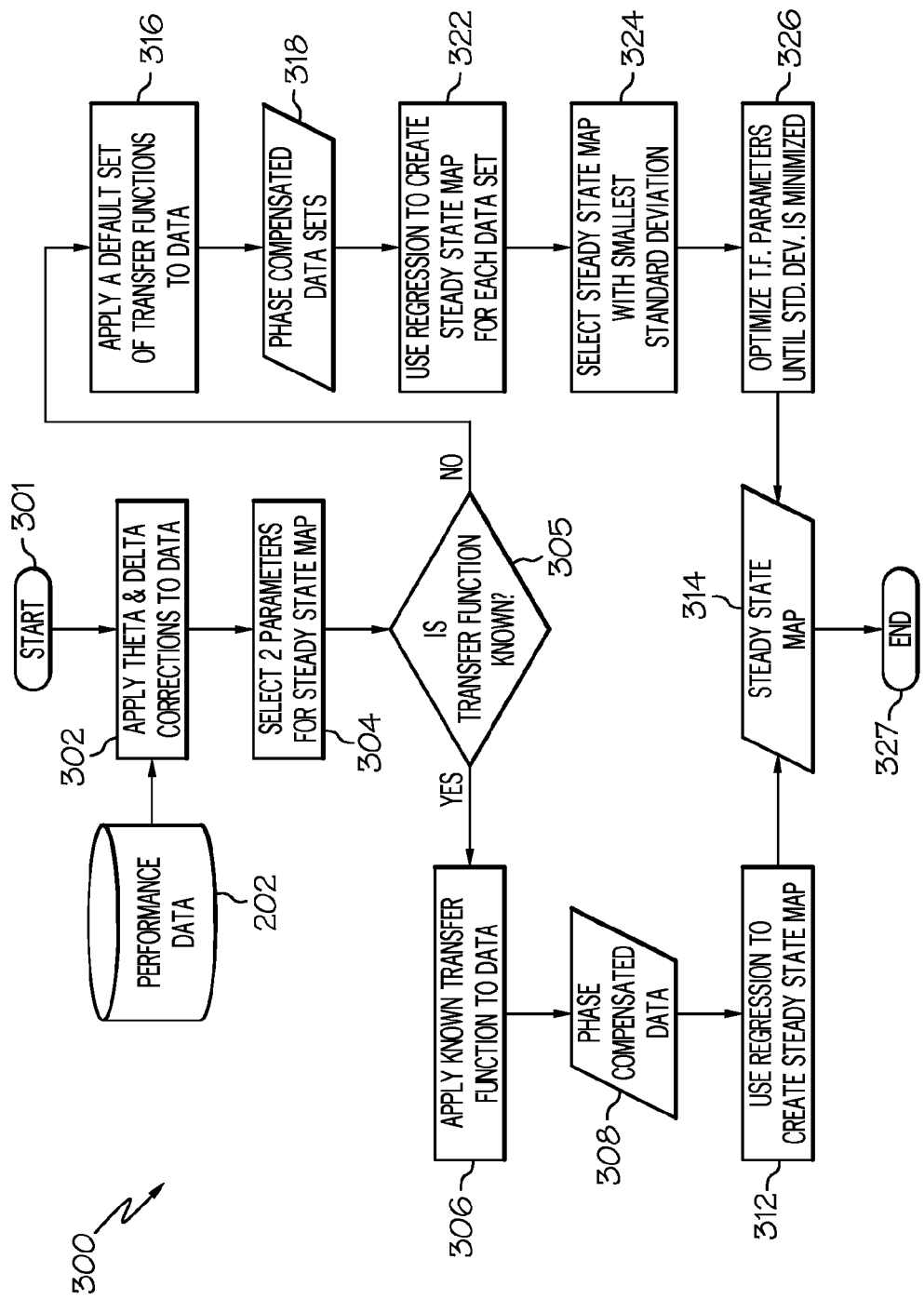
FIG. 3 is a process flowchart of the exemplary method of FIG. 2, with portions thereof depicted in slightly more detail.

It was previously noted that the transfer function (or functions) that is (or are) applied to the performance data, may be known or may be determined dynamically. Thus, part of the methodology that the processor 150 implements is a determination as to whether the transfer function(s) is(are) known. If a transfer function is not known, an appropriate transfer function is dynamically determined. With reference now to FIG. 3, an exemplary method for dynamically determining the transfer function(s) will be described in more detail. In doing so, it is noted that the parenthetical references in the following description refer to like numbered blocks in the process flowchart of FIG. 3.

It may be readily apparent that much of the previously described methodology is depicted in the process flowchart 300 in FIG. 3. As such, the details of any previously described portions of the methodology will not be repeated. However, for completeness, the entire method will be fully discussed. Thus, it is seen that the processor 150, upon initiating the method, applies the ambient condition corrections (302) to the retrieved performance data 202, and selects two of the performance parameters (304). Thereafter, which was not previously discussed in any detail, a determination is made as to whether the transfer function(s) that is(are) applied is(are) known (305). If the transfer function(s) is(are) known, the transfer function(s) is(are) applied to the performance data of the selected parameter(s) (306) to generate the phase compensated performance data (308), and the curve fit is applied (312) to generate the steady state map (314).

If the transfer function(s) is(are) not known, then the transfer function(s) is(are) determined dynamically by first applying a default set of transfer functions to the performance data of one or both of the selected parameters (316) to generate phase compensated data sets (318). The default transfer functions may vary, but are preferably based upon known system and component characteristics. For example, a first-order filter with an initial time constant between one and two seconds may be used as a default transfer function, depending on the particular performance parameters that were selected.

The phase compensated performance data that are generated from the default transfer function(s) is(are) subjected to a curve fit technique to generate a steady state map for each data set (322). The standard deviation of each steady state map is computed, and the steady state map with the smallest standard deviation is selected (324). Thereafter, the transfer function is optimized by selecting new parameters (e.g., a new set of time constants), and repeating the previous steps (e.g., 318-324) until the standard deviation of the steady state map is minimized (326). When the standard deviation of the steady state map is minimized, that steady state map is used (314). Moreover, while not depicted in FIG. 3, the transfer function associated with that steady state map is now known, and may be used in subsequent analyses.

The system and method described herein may be used to phase compensate transient performance data so that an accurate performance analysis of a machine, such as an aircraft gas turbine engine, may be conducted without having to explicitly obtain steady state performance data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of phase compensating transient performance data, comprising the steps of:
   supplying transient performance data for a plurality of parameters from a plurality of sensors to a processor; and
   in the processor:
      selecting two of the parameters;
      determining whether a transfer function is a known transfer function or an unknown transfer function;
      when the transfer function is a known transfer function, applying the transfer function to the transient performance data for at least one of the selected parameters to thereby generate phase compensated performance data representative of a steady state relationship between the selected parameters; and
      when the transfer function is not known:
         selecting a default set of transfer functions;
         applying the default set of transfer functions to the data for the selected parameters to generate a plurality of phase compensated performance data sets; and
         selecting the transfer function to which the transient performance data for the at least one selected parameter are applied based on the plurality of phase compensated performance data sets.

2. The method of claim 1, wherein the step of selecting the transfer function comprises:
   applying a curve fit to each phase compensated data set to generate a plurality of steady state maps, each steady state map associated with each phase compensated data set and being representative of a steady state relationship between the selected parameters;
   determining the standard deviation of each steady state map; and
   selecting the steady state map with the smallest standard deviation; and
   optimizing the transfer function associated with the selected steady state map until the standard deviation associated with the selected steady state map is minimized.

3. The method of claim 1, further comprising:
   applying a curve fit to the phase compensated performance data to generate a steady state map that is representative of the steady state relationship between the selected parameters.

4. The method of claim 3, wherein the steady state map comprises a steady state table.

5. The method of claim 3, wherein the steady state map comprises a steady state equation.

6. The method of claim 1, wherein:
   the transient performance data for one of the selected parameters leads the transient performance data for the other of the selected parameters; and
   the transfer function comprises one or more of a lead filter and a lag filter.

7. The method of claim 1, further comprising:
applying one or more ambient condition corrections to the collected transient performance data to thereby generate corrected transient performance data,
wherein the step of applying the transfer function to the transient performance data for at least one of the selected parameters comprises applying the transfer function to the corrected transient performance data.

8. The method of claim 1, wherein the transient performance data are associated with a machine, and wherein the method further comprises:
determining health status of the machine from the phase compensated performance data.

9. A system for phase compensating transient performance data, comprising:
a plurality of sensors, each sensor operable to sense a parameter and supply transient performance data representative of the sensed parameter; and
a processor coupled to receive the transient performance data from each of the plurality of sensors and configured to:
(i) select two of the parameters,
(ii) determine whether a transfer function is a known transfer function or an unknown transfer function,
(iii) when the transfer function is determined to be a known transfer function, apply the known transfer function to the transient performance data for at least one of the selected parameters to thereby generate phase compensated performance data that is representative of a steady state relationship between the selected parameters, and
(iv) when the transfer function is determined to be an unknown transfer function:
select a default set of transfer functions,
apply the default set of transfer functions to the data for the selected parameters to generate a plurality of phase compensated performance data sets, and
select the transfer function to which the transient performance data for the at least one selected parameter are applied based on the plurality of phase compensated performance data sets.

10. The system of claim 9, wherein processor is further configured to:
apply a curve fit to each phase compensated data set to generate a plurality of steady state maps, each steady state map associated with each phase compensated data set and being representative of a steady state relationship between the selected parameters;
determine the standard deviation of each steady state map; and
select the steady state map with the smallest standard deviation; and
optimize the transfer function associated with the selected steady state map until the standard deviation associated with the selected steady state map is minimized,
whereby the transfer function to which the transient performance data for the at least one selected parameter are applied is selected.

11. The system of claim 9, wherein the processor is further configured to apply a curve fit to the phase compensated performance data to generate a steady state map that is representative of the steady state relationship between the selected parameters.

12. The system of claim 11, wherein the steady state map comprises a steady state table.

13. The system of claim 11, wherein the steady state map comprises a steady state equation.

14. The system of claim 9, wherein:
the transient performance data for one of the selected parameters leads the transient performance data for the other of the selected parameters; and
the transfer function comprises one or more of a lead filter and a lag filter.

15. The system of claim 9, wherein the processor is further configured to:
apply one or more ambient condition corrections to the collected transient performance data to thereby generate corrected transient performance data; and
apply the transfer function to the corrected transient performance data for at least one of the selected parameters.

16. The system of claim 9, wherein:
the transient performance data are associated with a machine, and
the processor is further configured to determine health status of the machine from the phase compensated performance data.

17. A system for phase compensating transient performance data, comprising:
a plurality of sensors, each sensor operable to sense a parameter and supply transient performance data representative of the sensed parameter; and
a processor coupled to receive the transient performance data from each of the plurality of sensors and configured to:
(i) select two of the parameters,
(ii) apply a transfer function to the transient performance data for at least one of the selected parameters to thereby generate phase compensated performance data that is representative of a steady state relationship between the selected parameters, and
(iii) apply a curve fit to the phase compensated performance data to generate a steady state map that is representative of the steady state relationship between the selected parameters.

* * * * *